United States Patent [19]

Mayer

[11] Patent Number: 4,938,697
[45] Date of Patent: Jul. 3, 1990

[54] MULTI-DIMENSIONAL ASTRAL POSITION FINDING DEVICE

[76] Inventor: Ben Mayer, 1292 Stradella Rd., West Los Angeles, Calif. 90077

[21] Appl. No.: 273,889

[22] Filed: Nov. 21, 1988

[51] Int. Cl.⁵ ............................................. G09B 27/04
[52] U.S. Cl. .................................... 434/289; 434/284; 434/276; 33/271
[58] Field of Search ............... 434/262, 284, 289, 276; 33/269, 270, 271

[56] References Cited

U.S. PATENT DOCUMENTS

| | | | |
|---|---|---|---|
| 1,126,231 | 1/1915 | Kullmer | 434/289 |
| 1,150,731 | 8/1915 | Barcus | 434/289 X |
| 2,337,587 | 12/1943 | Brocky | 33/269 |
| 2,754,597 | 7/1956 | Sylvester | 434/289 X |
| 2,994,971 | 8/1961 | Meisenheimer et al. | 434/289 |
| 4,096,646 | 6/1978 | Solem | 434/289 X |

FOREIGN PATENT DOCUMENTS 2421431 11/1979 France ................................ 434/289

Primary Examiner—Richard J. Apley
Assistant Examiner—Joe H. Cheng
Attorney, Agent, or Firm—Poms, Smith, Lande & Rose

[57] ABSTRACT

A multi-dimensional astral position finding device for facilitating viewing selected sky areas such as constellations in the zodiacal band and elsewhere. A device which in combination with a pre-selected field of view facilitates positioning of the eye of the observer with respect to the north/south axis of the earth, the latitude of the observer's position, and time. The position finding device is pivotally mounted on a sky viewing frame or system, the position of the device being directly affected by gravitational forces, its location precisely determined with respect to the north/south axis of the earth by a compass carried by the device and serving as weight means for enhancing the gravitational effect to actuate positioning of the device, said device including indicia on a surface thereof arranged on radii extending from the axis of the pivotal mounting to facilitate desired inclination of the viewing frame relative to the horizon.

22 Claims, 4 Drawing Sheets

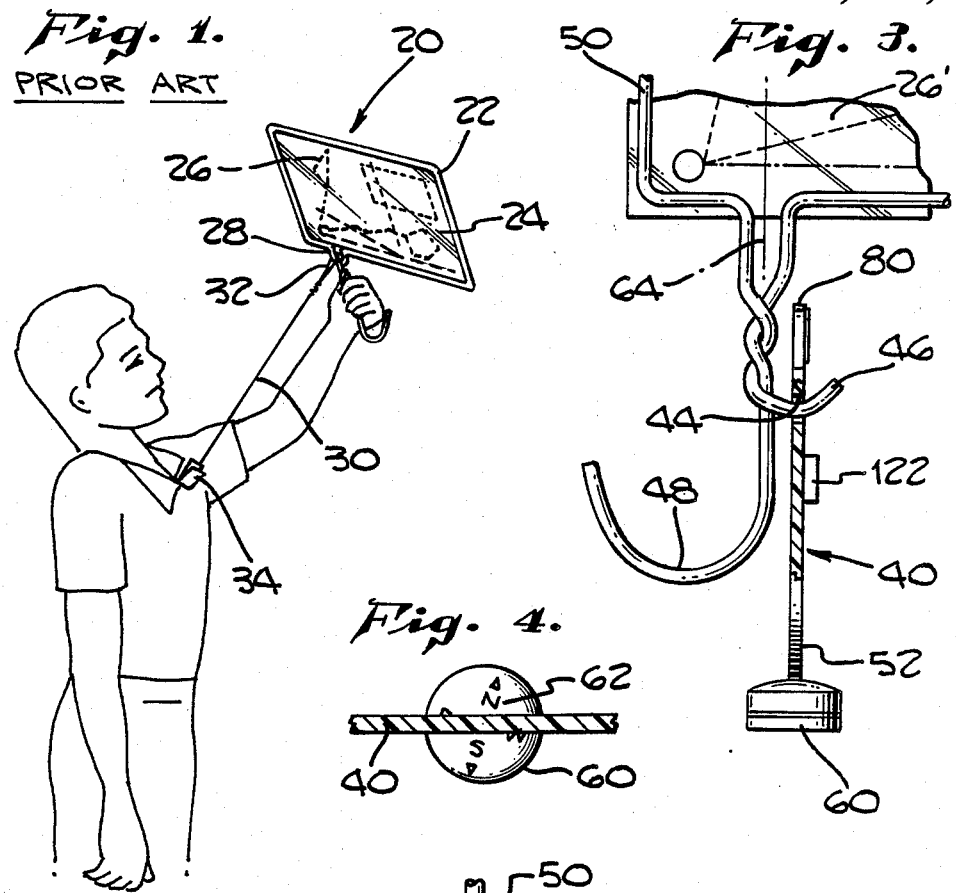
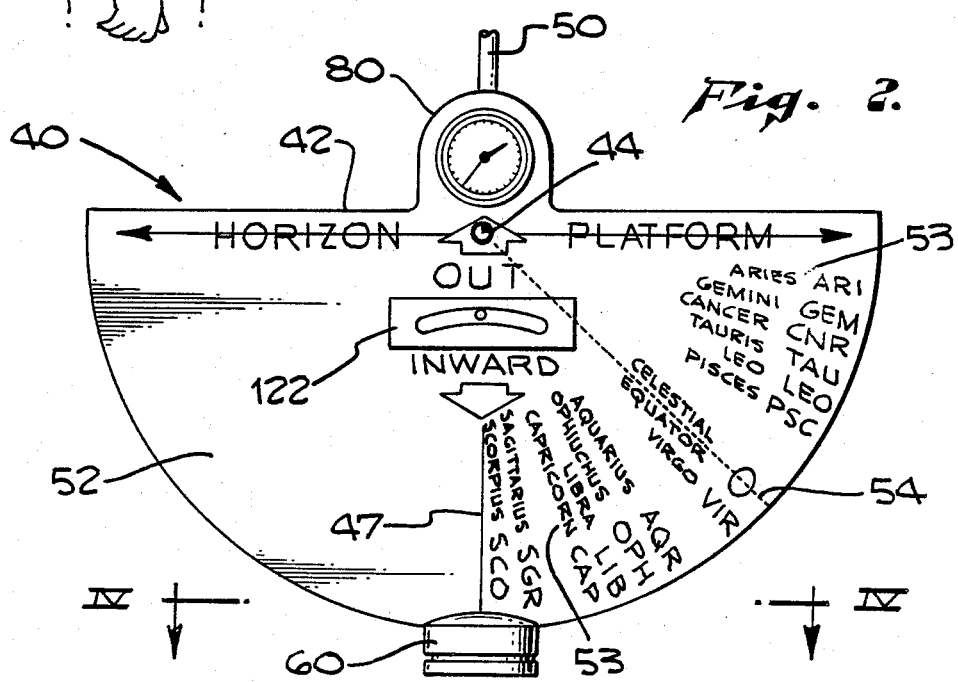

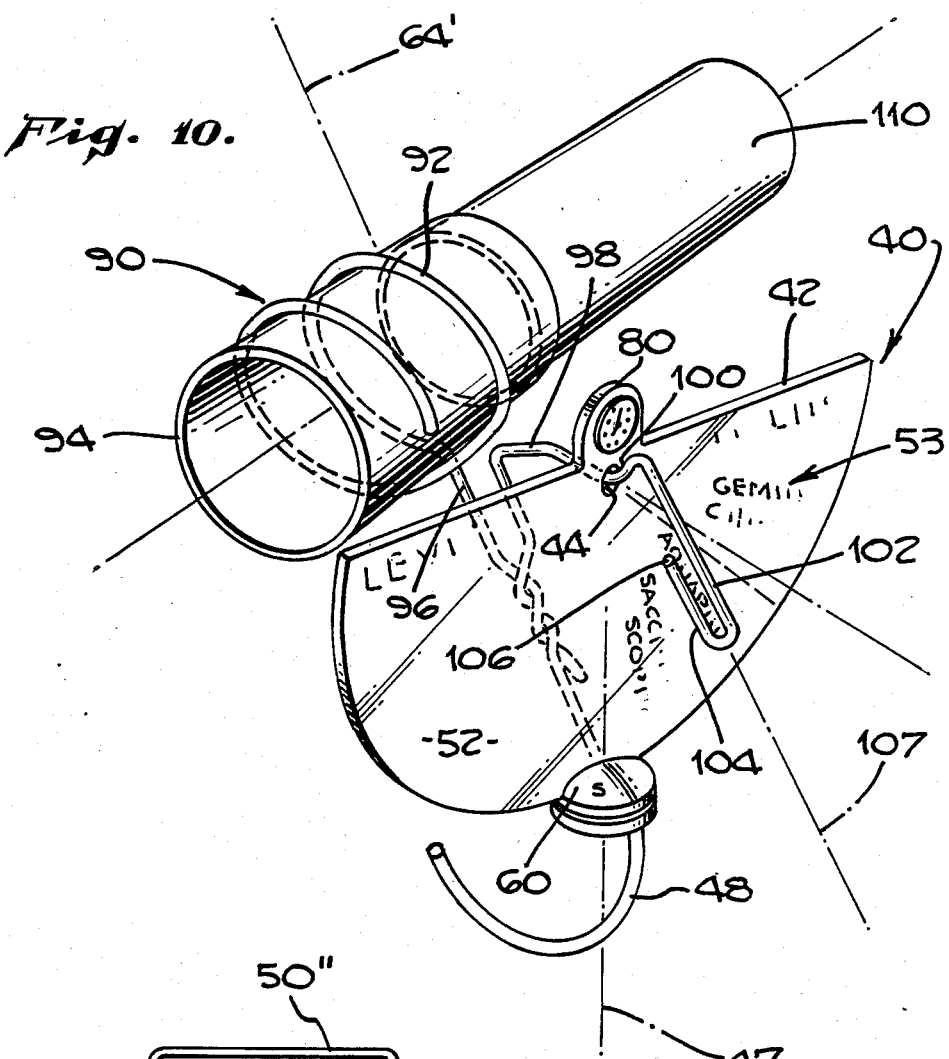
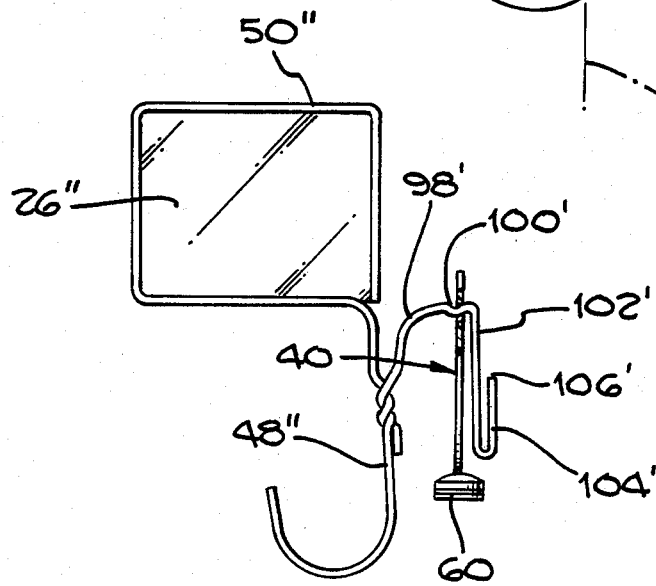

MULTI-DIMENSIONAL ASTRAL POSITION FINDING DEVICE

BACKGROUND OF INVENTION

The present invention relates to a multidimensional astral or star position finding device which enhances the procedure for selecting and finding for viewing a selected constellation which may be in the zodiacal band or may be elsewhere in the sky. The device of the present in associated with star viewing frames known as STARFRAME, a trademark for a viewing frame owned by Applicant, and STELLAPHANE, a star chart means a trademark also owned by Applicant.

The use of STARFRAME viewing means and STELLAPHANE star charts have been described in Applicant's book named *Starwatch* published by the Putnam Publishing Group of New York, N.Y., and by *Mercury*: publication of the Astronomical Society of the Pacific issue of July-Aug., 1987. The *Starwatch* book and the article in *Mercury* describe the use of a wire viewing frame having a selected and preferred aspect ratio of 11"×8¼", a transparent clear acetate sheet which may bear dots, arranged to represent a constellation to be viewed, the use of luminous dots when energized by light, for facilitating viewing the star chart arrangement in the dark, and a cord or distance determining element so that the viewing frame can be positioned a selected distance from the eye of the observer to provide a viewing angle through the viewing frame which will generally dimensionally correspond with the spacing of the stars in the sky being viewed so that the luminous dots on the star chart will appear as superimposed over the stars of the constellation in the sky. All of the information in the *Starwatch* book and the *Mercury* publication are incorporated herein to illustrate a prior proposed system for viewing constellations in the sky.

SUMMARY OF INVENTION:

The present invention contemplates a position finding device or three dimensional compass for use with a sky viewing system of the prior art and also with a new embodiment of a sky viewing system which will facilitate locating and viewing selected constellations and star groups in the night sky. The invention contemplates a multi-dimensional astral positioning device which facilitates alignment of a sky viewing system with a north/south axis of the earth, with an in and out axis of the earth, that is an axis extending from the center of the earth outwardly as determined by gravitational forces of the earth. In addition, the device includes and contemplates means for precisely positioning the viewing system relative to the latitude of the observer on the earth and the observer's relation to the celestial equator so that the viewing system may be accurately inclined relative to the earth horizon. In another example, the present invention contemplates a multi-dimensional device which includes time indicating means so that relation between universal time and location of a selected constellation in the sky and the position of the observer on the earth is readily correlated with the viewing system in order to quickly and easily locate a selected constellation or star group desired to be viewed.

The primary object of the present invention therefor is to provide a multi-dimensional positioning device for star viewing which enables an observer to quickly and readily locate a sky area to be viewed.

An object of the invention is to provide a position finding device readily associated with star viewing systems of the prior art to facilitate sky viewing.

Another object of the invention is to provide inexpensive readily constructed multi-dimensional compass means adapted to be pivotally mounted on a sky viewing system to precisely position its viewing axis and field of view for observing a selected sky area.

Still another object of the present invention is to provide a sky viewing system as mentioned above in which a compass means not only determines north and south position of the observer geomagnetically but also responds to gravitational forces for locating the means relative to an in and out axis of the earth to facilitate determination of an angle of inclination of the viewing system for rapid alignment of the viewing system with a selected sky area to be observed.

A still further object of the present invention is to provide a device as mentioned above in which means for indicating the position of the device relative to the horizon is carried on the pivotally mounted device.

The invention contemplates a three dimensional astro compass which automatically adjusts for angles of astronomical declination, instantly compensates for viewing altitudes of the historic zodiacal constellations north or south of the (celestial) equator anywhere on earth from +45° to −45° latitude, and, in one embodiment, permits observational astronomy and astrology from points north of the "Tropic of Cancer" to south of the "Tropic of Capricorn" Similar astro compasses can be created for viewing one or more of the 88 constellations in the astronomical celestial sphere.

The device of this invention senses directions simultaneously in three dimensions, namely, it conventionally aligns the device with the earth's magnetic poles, orients the device with respect to EAST/WEST and NORTH/SOUTH, and at the same time the astro compass perpetually demonstrates "UP" and "DOWN" in terms of the contemporary understanding of "OUT" and "IN" that is a radius extending from the center of the earth.

The invention contemplates in one example a semicircular member pivotally mounted on a sky viewing system and carrying a compass to position the sky viewing system with respect to north/south and east/west and to the horizon, and with respect to the location of a constellation in the sky to be viewed by proper inclination of the viewing axis of the viewing system. In another example of the invention, a semi-circular member of the invention may be fixed to the viewing system relative to the viewing axis and a pivotally mounted gravity actuated device indicates in correlation with indicia on the member a desired inclination of the viewing system axis. In a still further example means are provided for readily changing the viewing field.

Many other objects and advantages of the present invention will be readily apparent from the following description of examples of the invention as illustrated in the attached drawings.

In the drawings:

FIG. 1 is a perspective view of an observer using a sky area viewing device as known in the prior art.

FIG. 2 is an elevational view of one example of the present invention adapted to assist in orientation of the observer with the sky area to be viewed.

FIG. 3 is a fragmentary view showing the device of FIG. 2 associated with a viewing frame similar to that shown in FIG. 1, the view being partly in section.

FIG. 4 is a sectional view taken in the plane indicated by line IV—IV of FIG. 2 illustrating a compass carried by the device of FIG. 2.

FIG. 10 is a perspective view of a different embodiment of this invention utilizing the device of FIG. 2 in connection with another type of viewing means.

FIG. 11 is a front view of a smaller version of a viewing device adapted to match a Polaroid or 35 millimeter system format.

DETAILED DESCRIPTION OF THE INVENTION

Figure 5:
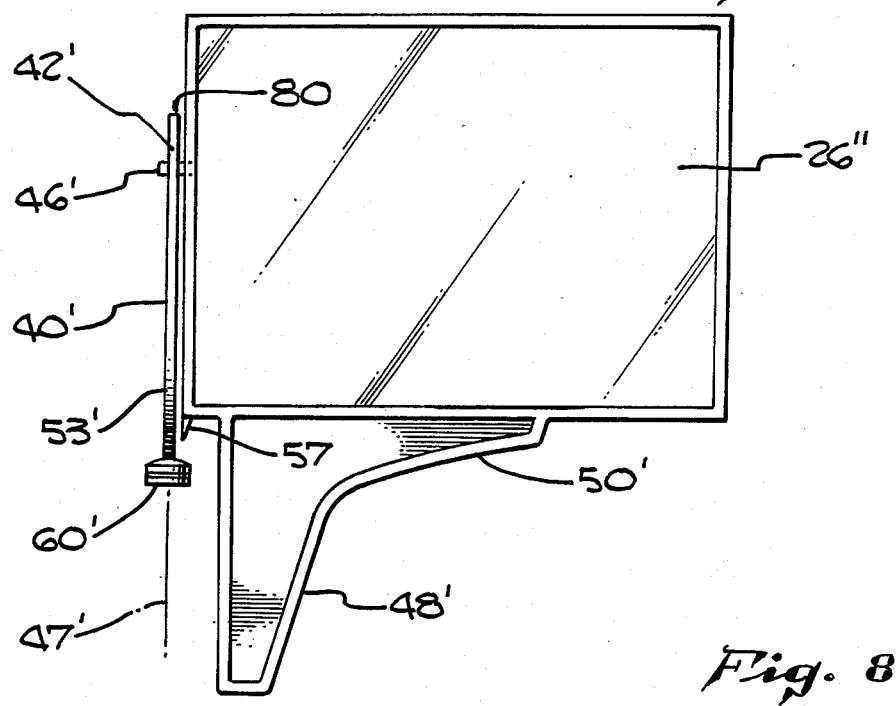
FIG. 5 is a fragmentary view of the device shown in FIG. 2 pivotally associated with a plastic transparent viewing frame.

In FIG. 1, a prior art device generally indicated at 20 may comprise a rectangular viewing frame 22 constructed of wire or a plastic, a transparent sheet 24 of acetate or other clear transparent material stretched across the wire frame 22 in a taut manner and adapted to bear representations of a constellation or sky area to be viewed as generally schematically shown at 26. The wire frame 22 includes a handle 28 adapted to be grasped by the left hand of the observer at a selected distance from the eye of the observer as determined by a cord or element 30 connected at one end at 32 to the handle and at the other end to a clip or suitable fastener 34 adapted to be attached to the shirt or collar of the observer. The structure and use of the prior art device 20 is described in the present inventor's books entitled *Starwatch* published by the Putnam Publishing Group, Copyright 1984, and in a publication of the Astronomical Society of the Pacific named Mercury of July-Aug., 1987, pages 1-8.

Use of the prior art viewing device 22 is fully described in the above references and briefly includes the fixing of the transparent sheet 24 on the frame with a representation or chart of the sky area to be viewed which, for example, may include constellations of the zodiac or other star groups. On printed dots on the star chart, may be placed luminous dots so that when viewing at night the luminous dots may be energized by a flash or other light source so that when the frame 22 is properly positioned, the luminous dots will be approximately registered over the selected stars in the sky area being viewed. In viewing with device 20, it is important that the frame be positioned a selected length from the eye of the observer in order that the angle of view of the eye through frame 22 will encompass the viewing area of the sky to be viewed and to correspond therewith so that the luminous dots on the transparent acetate sheet representing the stars to be viewed will dimensionally correspond to the relative angularly subtended locations of the stars in the sky area being viewed. As indicated in Applicant's books identified above, a selected distance is approximately fifteen to eighteen inches, the length of the cord 30, for a viewing frame 22 approximately 11"×8½".

Also in use of the prior art device, it was necessary to determine through other means the northsouth direction. Reference also was required to be made to a chart for culmination times of the constellations to be viewed in order to show the proper angle of inclination of frame 22 with respect to the horizon at a selected time in order to cause the viewing angle as defined by the viewing frame to coincide with the selected sky area to be viewed.

The present invention contemplates a multi-dimensional compass means or position finding apparatus adapted to be associated with a sky viewing system which may include the rectangular wire or plastic frame of the prior art, or a camera view finding system, or a cylindrical open-ended viewing member of selected diameter and selected length in order to correlate the viewing angle of the eye of an observer with the field of view of the viewing system used and the area of the sky to be viewed.

In the first example of this invention shown in FIGS. 2-4, inclusive, an indicia carrying planar member, generally indicated at 40 is of generally semi-circular shape having a chord line or edge 42 lying slightly above a diameter of the semi-circle. At the center of the diameter of the semi-circle is provided a port 44 for reception of a pivot member 46 carried by wire handle 48 of a wire frame 50. The member 40 includes a flat surface 52 which carries indicia 53 which in this example relates to constellations in the zodiacal band. The indicia 53 of each of the signs of the zodiac are arranged radially extending from port 44 to the circumferential edge of the semi-circular member 40. The indicia 53 includes a line 54 indicating location of the celestial equator. As illustrated in the second quadrant II of member 40 and which lies to the right of and below port 44, above the celestial equator 54 may lie the constellations Aries, Gemini, Cancer, Taurus, Leo, and Pisces, arranged on radii which extend over an included angle from the celestial equator of approximately 23½". Below the celestial equator and over a similar included angle of 23½° and on radii are the indicia for fields of view of constellations of Virgo, Aquarius, Ophiuchus, Libra, Capricorn, Sagittarius and Scorpius. The included angle of 47° represented by the indicia means 53 in the second quadrant II corresponds generally to the width of the zodiacal band in relation to the earth as described in the above prior art references.

A compass means 60 is attached in a suitable manner as by adhesive bonding to the circumferential edge of member 40 at the end of a radius which separates or divides the second quadrant II from the third quadrant III, of semi-circular member 40. Compass means 60 may be any suitable compass in which a north-south indicator generally shown at 62 is provided so that the observer may orient himself in a north-south direction and, in the northern hemisphere, assume a direction looking directly south, the purpose of which will be explained hereafter.

Compass means 60 also serves as a weight means for pivotally mounted member 40 which will then assume by gravitational forces a position relative to the earth so that the chord line or edge 42 will be positioned horizontally.

Thus, when member 40 is freely pivotally mounted on pivot member 46 of the viewing system (frame 50), member 40 will position itself with respect to the earth and determine an "in" and "out" axis 47, the top edge 42 may be horizontally disposed, and by observance of compass 60, the observer will position himself precisely in a north-south direction. When a selected constellation is to be viewed, such as Pisces, the viewing frame 50 may be inclined about the pivot axis provided by the pivot member 46 and the port 44 until the axis 64 of the handle 48 of the viewing frame lies in prolongation of the radius on which the indicia information Pisces has been indicated. The axis 64 lies in the plane defined by the rectangular frame 50 and the plane of the frame is thus tilted. A desired inclination of the viewing frame is thereby achieved for positioning of star chart 26' in viewing frame 50 at a proper angle to view a selected zodiacal constellation.

In FIG. 5, a fragmentary portion of a plastic viewing frame construction is indicated at 50' which includes a handle 48' and is provided with a transparent star chart 26". A side member of frame 50' carries a pivot pin 46' threaded in the side member and provides a pivotal mounting for a device 40' embodying the same indicia information 53 and a compass 60' as described in the prior example. The device 40' pivots about the pivot pin 46' in the same manner as the device 40 pivots about the pivot member 46 and because of the weighted compass 60", seeks a position in which the edge 42' is horizontal. Tilting of frame 50' relative to the horizontal edge 42' or relative to the axis 47' serves to position the viewing frame at the proper angle for desired viewing of the sky area to be viewed. A pointer 57 on frame 50' facilitates locating the selected constellation.

Figure 6:
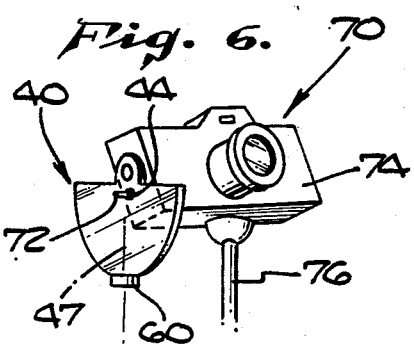
FIG. 6 is a perspective front view of a camera such as a 35 mm camera employing the device of FIG. 2.
Figure 7:
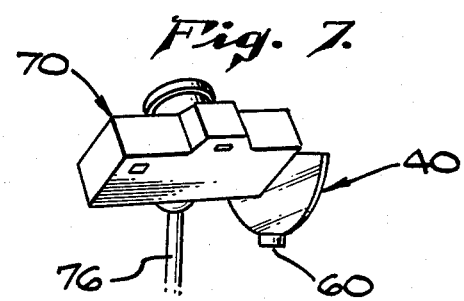
FIG. 7 is a fragmentary top rear view in perspective of the camera shown in FIG. 6 illustrating further use of the device of FIG. 2 for viewing a selected sky area.

In another example of use of device 40, is shown in FIGS. 6 and 7. A camera means 70, such as a 35 mm camera, may be provided with a pivot member 72 at one end of camera body 74 in any suitable manner. Pivotally mounted on said pivot member 72 may be device 40 provided with port 44 for reception of pivot member 72. The indicia information means on member 40 shown in FIGS. 6 and 7 may be the same as illustrated in FIG. 2. The device 40 includes the compass means 60 shown in FIG. 2. Thus, the viewing system (the view finder and lens) of a camera is utilized as a substitute for viewing frame 50 of the first example of this invention. The sky area viewed through the 35 mm camera is substantially the same as the sky area viewed using the viewing frame 22 spaced approximately 15 to 18 inches from the observer's eye as described above. Camera 70 may be precisely positioned relative to north and south by compass 60, relative to the "in" and "out" gravity or earth axis, as described in the first example, and also inclined in accordance with the selected sky area to be viewed as indicated by the indicia means 53 on device 40. As shown in FIGS. 6 and 7, camera 70 may be preferably mounted on a tripod 76, generally illustrated.

In connection with the use of the examples of this invention shown in FIGS. 2, 5 and 6, it should be noted the positioning of the viewing system relative to the north-south axis of the earth and the inclination of the viewing system to view a particular sky area is related, in this example, to culmination times of the zodiacal constellations at their zenith in the night sky at a particular date and time, for example, as indicated by culmination time charts in the book *Starwatch* mentioned above.

Since the constellations being observed will reach their culmination point at predetermined known dates and times, member 40 may be provided with a small, compact time piece with a luminous digits or a dial directly opposite compass means 60, as indicated by timepiece 80. Location of timepiece 80 directly opposite the compass means 60 will impose no change on the reaction of the member 40 to gravitational forces of the earth in order to position member 40 in relation thereto.

Figure 8:
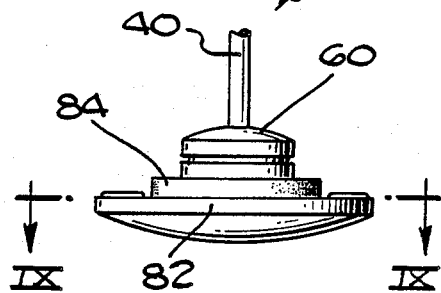
FIG. 8 is a fragmentary view of a modification of the time device shown in FIG. 2, the timing device being associated with the compass 60.
Figure 9:
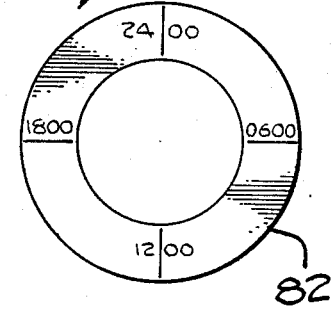
FIG. 9 is a view taken in the plane indicated by line IX—IX of FIG. 8 and showing representative time indicia on a circumferential margin of the timing device.

The present invention also contemplates that location of a time piece may be associated with the compass 60 as illustrated in FIGS. 8 and 9. In FIG. 8, the member 40 may carry a compass 60 as described in the first example. In this example of a time piece, a 24 hour clock of non-ferrous construction is generally indicated at 82 and is associated with the bottom of compass 60 through a non-magnetic plastic foam material 84 to insulate the magnetic compass 60 from any possible interference by the time piece 82. The time piece 82 may carry time indicia in the nature of a 24 hour clock and such indicia are generally indicated in FIG. 9 on the circumferential margin of the time piece 82. It will be understood that the time piece 82 may also be a battery driven LC time device with a 24 hour circuit. Such a time piece 82 may be attached to the compass 60 in any suitable manner as by adhesives or mechanical connections. The placing of timepiece 82 at the bottom of the compass 60 further accentuates the weight below the pivot member to enhance gravitational positioning of member 40.

In the embodiment of this invention shown in FIG. 10, the semi-circular member 40 is the same as that described above with respect to FIG. 2 and may include compass means 60, the indicia means 53 of the zodiacal constellations, a pivot port 44, and the edge 42 which will assume a horizontal position due to gravity forces acting through compass means 60.

In this embodiment of the invention, a viewing system is provided by a viewing mounting means 90 comprising two or more turns of a helical wire 92 of a selected helical diameter in order to receive and hold an open-ended cylindrical member of viewing member 94 of a selected diameter and length or other viewing means to provide a related astronomical or telescopic function for viewing a sky area. The mounting means 90 may include wire portions 96 providing a handle 48 similar to the handle portion 48. However, in this embodiment of the invention, one of the wire portions 98 which extends outwardly in the same direction as pivot member 46 of the first embodiment, may include an indentation or crimp 100 which will locate and position device 40 relative to mounting means 90. The portion 98 is further extended and is turned or bent at right angles to provide a wire portion 102 which extends parallel to flat surface 52 of device 40. The wire portion 102 is provided with a return end portion 104 which lies in spaced parallel relation to portion 102 and provides an elongated window like opening 106 having a longitudinal axis 107 parallel to a radius extending from port 44 to the circumference of the semi-circular device 40. The axis of the window 106 thus would lie parallel to and in the same plane as the axis 64 of the handle 48 and its relation to the viewing axis of the viewing member 94 and the plane of the field of view therein will be substantially identical.

The viewing system illustrated in FIG. 10 which includes cylindrical open-ended member 94 when of a selected diameter and length will provide an observer's eye positioned close to the open end of the tube with a viewing angle or field of view similar to that of a 7×35 binocular. The field of view may be narrowed by providing an adjustable extension cylindrical member 110 which may be telescopically received within tube 94 as indicated in FIG. 10 and longitudinally adjustably positioned with respect to the eye to provide, for example, the field of view of a binocular 7×50.

In this embodiment of the invention, the use of a star chart 26 as described above with respect to the embodiment of FIG. 2 is not required to be associated with the viewing system. In use of the invention shown in FIG. 10, the observer may align himself in the northsouth direction looking south as in the previous embodiment, select a culmination time for the constellation or area of the sky to be viewed, and then proceed to incline the viewing tubes 94 and 110 until the window 106 is aligned with the indicia means on the device 40 indicating the constellation to be viewed.

In the embodiment shown in FIG. 11, a wire frame 50" is fragmentarily shown and carries a transparent acetate sheet 26" carrying a sky chart as above described. In this embodiment of the invention, the wire handle 48" is provided with an extension portion 98" similar to the extension shown in FIG. 10. Such an extension is provided with a crimp 100' and a portion 102' which is provided with a return 104' to provide an elongated radially extending window 106' similar to the structure shown in FIG. 10. The device 40 may be the same as that shown in FIGS. 2 and in FIG. 10.

Figure 12:
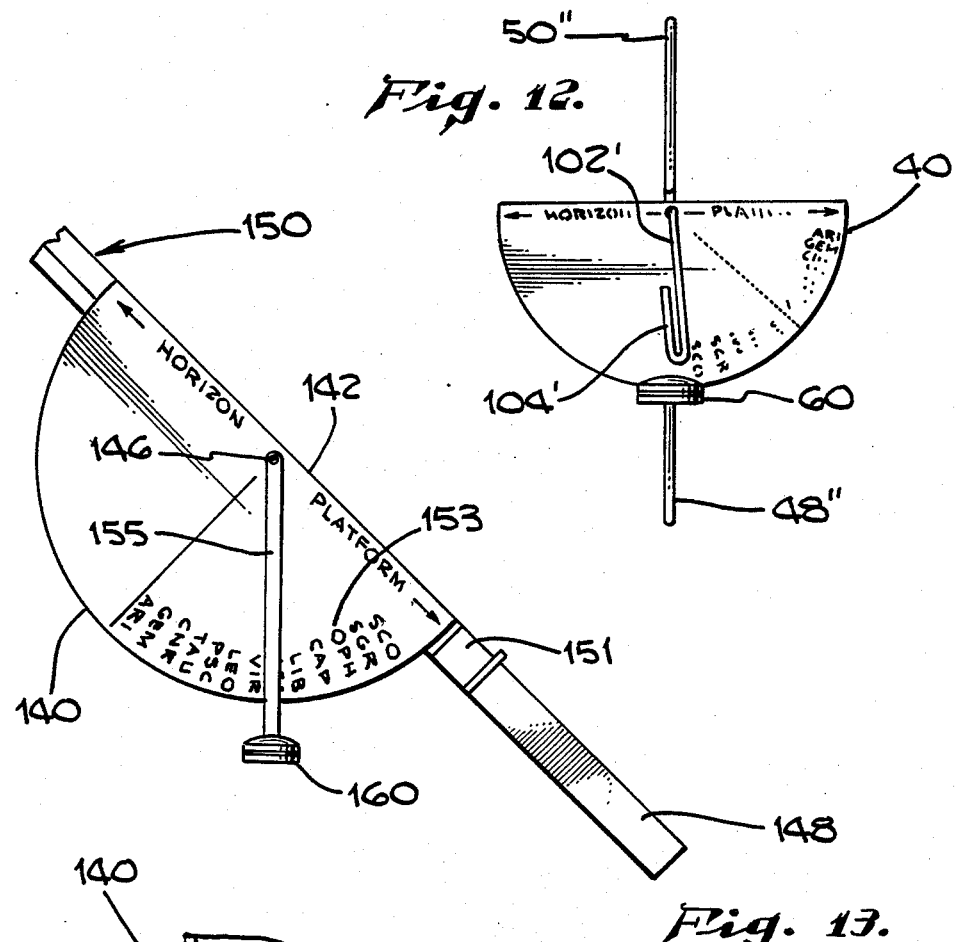
FIG. 12 is a side view of FIG. 11 taken from the right thereof.

The embodiment of the invention shown in FIGS. 11 and 12 has substantially the same rectangular wire frame configuration of that shown in FIG. 3 as modified to show the wire extensions 98 of FIG. 10. The wire frame in this embodiment is substantially smaller than the configuration of the prior examples and in this example the configuration is reduced to a 90 millimeter by 72 millimeter aspect ratio proportion to adapt the wire frame to hold a Polaroid negative of an exposure made of a star constellation by a Polaroid camera or a 35 millimeter camera. Such a negative may be attached to the wire frame by Scotch tape or other suitable adhesive means. In effect, the negative of an exposure made by a Polaroid camera becomes a star chart similar to the star chart 26 but reduced in size. It will be understood that Polaroid film may now be obtained to provide a negative as well as a positive exposure.

When using the example of the invention shown in FIGS. 11 and 12, the viewing frame is held closer to the eye than in the prior embodiment and in this example a distance of approximately five inches or 120 to 150 millimeters. This distance may be measured from the viewing frame to the bridge of the observer's nose and may be accurately established by use of a ruler or by use of a shortened cord similar to that described in connection with FIG. 1 of the prior art.

The examples of the sizes of the viewing frames described hereinabove have included a 11 inches×8½inches format and a 90 millimeter by 72 millimeter format. The aspect ratio of the rectangular viewing frame may be modified if desired in order to adapt the viewing frame to the Polaroid format as mentioned above, 35 millimeter film format, or to the aspect ratio of television screens when video tapes are used to project star constellations on a television screen.

Figure 13:
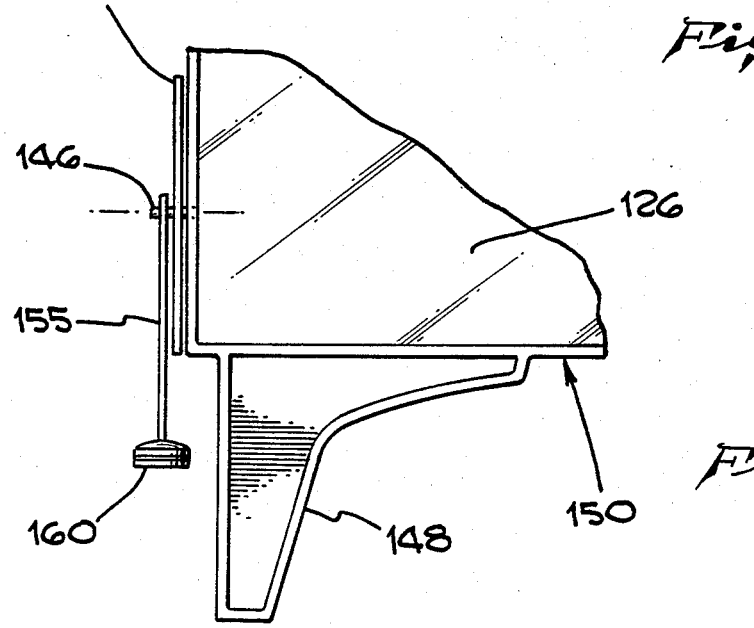
FIG. 13 is a fragmentary end vieW of another embodiment of the invention with the semi-circular member of the device fixed to the viewing frame.
Figure 14:
FIG. 14 is a fragmentary front view of the device shown in FIG. 13.

In the example of the invention shown in FIGS. 13 and 14, a plastic type viewing frame 150, similar to that shown in FIG. 5, is fragmentarily illustrated, such viewing frame being of rectangular configuration and having a star chart 126 as in the prior embodiments. In this example, the semi-circular member 140 is affixed by suitable adhesive or bonding means to the edge face 151 of the frame 150 with its top edge 142 flush with the top edge of the edge face 151 of the viewing frame. The indicia 153 on the face of the semi-circular member 140 is similar to that shown in the prior example.

The frame 150 is provided with a pivotal member 146 which extends through the radial center of member 140 and extends therebeyond for pivotal mounting of a rod 155 which carries at its bottom a compass 160 similar to those of the prior embodiment. The compass 160 provides weight means which provides a plumbing means for determining the in and out axis of the earth with respect to the viewing frame and also provides in relation to the indicia printed on the member 140 the tilt angle of the viewing frame for viewing a selected constellation of the zodiacal band. In this embodiment of the invention, the order and positions of the indicia representing the constellations must be reversed from the order of the constellations in the prior embodiment.

In the above examples of this invention, a semicircular member containing indicia means of the zodiacal band or other star constellations located with respect to the celestial equator have been shown and described. It will be understood that if desired a well known type of planisphere comprising two or more relatively movable disks mounted about an axis with indicia giving day, month and time information, may be pivotally mounted on the pivot member and used with the member 40 as shown in the examples of FIGS. 3, 5, and 10.

It should also be noted that in the examples of the invention described above, the location of the constellations of the zodiacal band on the member 40 are directly related to culmination times of such constellations as mentioned above. When a planisphere is associated with a pivot member, together with the semi-circular member 40, information on this planisphere giving the month, date and hour may be utilized in viewing constellations at other than culmination times by moving the viewing frame relative to the east/west axis which has been determined by the compass. Thus, a constellation may be viewed earlier than 12:00 midnight by moving and slight tilting of the viewing frame toward the east. Or the constellation may be viewed later than 12:00 midnight by moving the viewing frame slightly to the west for the later viewing of the constellation. In the format of the viewing frame as described with respect to FIGS. 2-4, 5, and a viewing frame which embodies the 11×8½ configuration, the span of 11 inches when viewed at a selected distance of 15 to 18 inches will subtend approximately two hours of astronomical "Right of ascension (RA)" in longitude. The 8½" span will define the angular astronomical measure of approximately 30 degrees of declination in latitude.

The advantages of the present multi-dimensional astral compass will be readily apparent to those skilled in the art. The sky viewing system or apparatus may be readily hand made of a wire coat hanger as pointed out in the prior art books of Applicant. The proper positioning or orientation of the observer and the sky viewing frame is enhanced by the pivotal mounting of the member 40 in which the member 40 becomes oriented by gravitational forces as caused by the weight of the compass means and are directionally oriented north and south by the magnetic compass. A spirit level 122 may be incorporated on the member 40 so as to confirm empirically the horizontal positioning of the top edge of the semi-circular disk. Such spirit levels may be made with luminous fluid so that they may be readily observed at night. Such spirit level 122 is generally illustrated in FIG. 3 on the member 40.

The embodiments of this invention described above may be modified and may be changed in construction and mode of operation, and all such changes and modifications coming within the spirit of this invention and coming within the scope of the appended claims are embraced thereby.

I claim:

1. In a device for viewing a sky area, the device including a viewing frame means of selected shape and size, a transparent sheet on the frame means provided with a star chart and a distance determining element to approximately fix the viewing frame means distancewise from the eye of the observer to relate the star chart to the sky area and the corresponding stars with a selected viewing angle, the combination of:
    means on the viewing frame means providing a pivot member having a pivot axis;
    an indicia carrying member pivotally mounted on the pivot member and having a surface lying normal to the pivot axis;
    a weight means on the indicia member to position the indicia member about said axis relative to the earth and horizon; and
    indicia information on the surface of the indicia member arranged in relation to the angle of the sky area to be viewed with respect to the horizon;
    the selection of said indicia information on the surface of the indicia member corresponding to the sky area to be viewed to provide super-imposition of the star chart, over the selected sky area at a selected time.

2. An apparatus as stated in claim 1 wherein said weight means includes a compass.

3. An apparatus as claimed in claim 1, further including
    an extension portion on said pivot member,
    said extension portion lying in a plane normal to the axis of the pivot member and arranged to overlie said indicia information to provide selection of said indicia information and desired inclination of the viewing frame.

4. An apparatus as stated in claim 3 wherein said extension portion having a return end portion to provide an elongated viewing window for reading said indicia information.

5. An apparatus as claimed in claim 1 wherein said viewing frame means is a view finder structure of a camera;
    said camera being provided with said pivot member.

6. An apparatus as stated in claim 1 wherein said viewing frame, said pivot member and said extension portion are formed from wire.

7. A multi-dimensioned position finding apparatus for use in viewing a sky area and for orientation of an eye of an observer with respect to a selected sky area comprising, in combination:
    a sky viewing means including pivotal mounting means having a pivot axis;
    a member pivotally mounted on said sky viewing means by said pivotal mounting means and having a planar surface lying in a plane normal to said pivot axis of the mounting means;
    means carried by said member for positioning said member relative to the horizon and relative to a north and south axis of the earth; and
    indicia means on said surface extending in a radial direction from said pivot axis and representative of latitude, orientation of said member by reference to said positioning means relative to the horizon and to the north and south axis of the earth, and by reference to said indicia means serving to locate a selected sky area to be viewed.

8. An apparatus as claimed in claim 7, further including
    means carried by said pivotal mounting means providing a radially extending window over said indicia means for facilitating selection of a selected indicia means.

9. An apparatus as claimed in claim 7 wherein said sky viewing means, includes a helical coil of wire of selected diameter,
    and hollow open ended tube means held by said coil of wire and of selected length and diameter to provide a viewing angle corresponding to the sky area to be viewed.

10. In combination:
    a sky viewing means delineating an actual area of the sky to be viewed;
    and means responsive to gravitational forces carried by said sky viewing means to orient the sky viewing means and the eye of an observer with respect to a latitude position, the north and south axis of the earth, and the horizon.

11. The combination as claimed in claim 10 wherein said sky viewing means includes a rectangular frame of selected aspect ratio to provide a field of view for the eye of said observer positioned a selected distance from the frame and;
    the means responsive to gravitational forces having a pivotal mounting on said rectangular frame.

12. The combination as claimed in claim 10 wherein said sky viewing means comprises a view finger of a camera and the optical system of the camera;
    and means pivotally mounting the means responsive to gravitational forces on the camera.

13. A combination as claimed in claim 10
    wherein said sky viewing means comprises cylindrical open ended tubular members of selected diameter and length;
    and means pivotally mounting the means responsive to gravitational forces from one of said tubular members.

14. A combination as claimed in claim 10 wherein said means responsive to gravitational forces is pivotally mounted on the sky viewing means, and includes weight means to position said means responsive to gravitational forces relative to the earth.

15. A combination as claimed in claim 11 further including
    indicator window means extending from said pivotal mounting in a radial direction for showing a selected indicia on said carrier means.

16. A combination as claimed in claim 14 wherein said means responsive to gravitational forces further includes a semi-circular disk provided with said weight means at its circumference for positioning said disk by gravitational forces;

a spirit lever secured to said disk for indicating a horizontal position of said disk;

and indicia means on both sides of said disk indicating latitude on the earth and selected constellations in the sky.

17. A combination as claimed in claim 13 wherein said means responsive to gravitational forces includes a surface provided with indicia means arranged along a radius extending from an axis of the pivotal mounting.

18. In an apparatus for facilitating viewing of a selected sky area, the combination of:

a sky viewing means provided with a selected field of view;

means carried by said sky viewing means provided with radially arranged indicia identifying constellations to be selected;

means responsive to gravity carried by said sky viewing means;

and a pivotal mounting for pivotally mounting said means responsive to gravity on said sky viewing means.

19. The apparatus as claimed in claim 18 wherein said means responsive to gravity includes compass means.

20. An apparatus as claimed in claim 18 wherein said means responsive to gravity includes a rod having one end connected to said pivotal mounting and its other end adapted to carry a weight means;

and wherein said means carried by said sky viewing means provided with indicia being fixed on said sky viewing means.

21. A position finding means for viewing a selected area of the sky at a selected time and having a sky viewing means defining a selected angle of view and aspect ratio of the sky area to be viewed, comprising:

a first information bearing means having indicia arranged thereon relating to the sky area to be viewed;

a second weight means responsive to gravitational forces; and means for pivotally mounting on the sky viewing means said first information bearing means for movement relative to said sky viewing means for determining the angle of inclination of the sky viewing means to position the sky viewing means for viewing a selected sky area indicated on the first information bearing means, and said second weight means being pivotally carried by said sky viewing means.

22. A position finding means for viewing a selected area of the sky at a selected time and having a sky viewing means defining a selected angle of view and aspect ratio of the sky to be viewed, comprising:

a first information bearing means having indicia arranged thereon relating to the sky area to be viewed;

a second weight means responsive to gravitational forces; and means for pivotally mounting on the sky viewing means said first information bearing means for movement relative to said sky viewing means for determining the angle of inclination of the sky viewing means to position the sky viewing means of viewing a selected sky area indicated on said first information bearing means and said second weight means being connected with said first information bearing means for movement therewith.

* * * * *